United States Patent
Charlton et al.

(10) Patent No.: US 8,686,944 B1
(45) Date of Patent: Apr. 1, 2014

(54) SOFTWARE FOR INPUT DEVICES WITH APPLICATION-SPECIFIC SCROLLING AND HIGHLIGHTED TEXT SEARCHING

(75) Inventors: Erik Charlton, Atherton, CA (US);
Christophe Dayer, Onex (CH);
Jean-Daniel Zanone, Lausanne (CH);
Greg Dizac, Palo Alto, CA (US); Eric Tissot-Dupont, San Francisco, CA (US);
Asif Ashan, Livermore, CA (US);
Spencer Johnson, Palo Alto, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 1261 days.

(21) Appl. No.: 11/844,312

(22) Filed: Aug. 23, 2007

Related U.S. Application Data

(60) Provisional application No. 60/840,072, filed on Aug. 23, 2006.

(51) Int. Cl.
*G09G 5/08* (2006.01)

(52) U.S. Cl.
USPC .......................... 345/163; 715/785; 345/184

(58) Field of Classification Search
USPC .......... 345/163–169, 747, 769, 156; 715/784, 715/785, 786, 700, 831
See application file for complete search history.

(56) References Cited

U.S. PATENT DOCUMENTS

| | | | |
|---|---|---|---|
| 5,313,229 A | 5/1994 | Gilligan et al. | |
| 5,473,344 A | 12/1995 | Bacon et al. | |
| 5,530,455 A * | 6/1996 | Gillick et al. | 345/163 |
| 5,805,161 A | 9/1998 | Tiphane | |
| 5,982,370 A | 11/1999 | Kamper | |
| 6,064,370 A | 5/2000 | Wang et al. | |
| 6,157,369 A | 12/2000 | Merminod et al. | |
| 6,259,432 B1 * | 7/2001 | Yamada et al. | 345/159 |
| 6,337,694 B1 * | 1/2002 | Becker et al. | 715/785 |
| 6,341,306 B1 | 1/2002 | Rosenschein et al. | |
| 6,519,631 B1 | 2/2003 | Rosenschein et al. | |
| 6,584,469 B1 | 6/2003 | Chiang et al. | |
| 6,686,904 B1 | 2/2004 | Sherman et al. | |
| 6,700,564 B2 | 3/2004 | McLoone et al. | |
| 6,785,670 B1 * | 8/2004 | Chiang et al. | 707/706 |
| 7,071,919 B2 | 7/2006 | Hinckley et al. | |
| 7,094,980 B2 | 8/2006 | Ahn | |
| 7,733,328 B2 | 6/2010 | Blandin et al. | |
| 8,578,292 B2 * | 11/2013 | Lang et al. | 715/788 |
| 2002/0080179 A1 * | 6/2002 | Okabe et al. | 345/769 |
| 2003/0067484 A1 * | 4/2003 | Moir | 345/747 |
| 2004/0189600 A1 * | 9/2004 | Hinckley et al. | 345/156 |
| 2005/0097466 A1 * | 5/2005 | Levi Montalcini | 715/700 |

FOREIGN PATENT DOCUMENTS

JP 2002-366300 A 12/2002

* cited by examiner

*Primary Examiner* — Kevin M Nguyen
(74) *Attorney, Agent, or Firm* — Kilpatrick Townsend & Stockton LLP

(57) ABSTRACT

The response to the movement of a scroll wheel varies depending upon the application currently being used. The variation can be in ratcheting vs. free wheeling, speed and acceleration. Ratcheting can be automatic in word processing, with free wheeling automatic in photo editing, for example. In another aspect of the invention, text can be highlighted and searched by pressing a button on an input device to activate a search. The search can either be an Internet search or a desktop search. Different manners of activating the button (such as a short press vs. a long press) can be used to select between an Internet and desktop search.

14 Claims, 5 Drawing Sheets

SOFTWARE FOR INPUT DEVICES WITH APPLICATION-SPECIFIC SCROLLING AND HIGHLIGHTED TEXT SEARCHING

CROSS-REFERENCES TO RELATED APPLICATIONS

This application claims the priority to U.S. Provisional Patent Application No. 60/840,072, titled "Advanced Software for Input Devices," filed Aug. 23, 2006, which is incorporated by reference herein in its entirety including all appendices thereto and all references incorporated by reference therein. Related applications are "Mouse Roller With Horizontal Scrolling and Horizontal Tilting Switch," application Ser. No. 10/922,393, filed Aug. 19, 2004; "Scrolling Device," application Ser. No. 10/884,543, filed Jul. 2, 2004; "Roller With Multiple Force Sense Levels," application Ser. No. 10/857,674, filed May 28, 2004; "XY Roller for Scrolling Along Two Axes," application Ser. No. 10/842,988, filed May 10, 2004; "Low Profile Tilting Roller Dogbone," application Ser. No. 10/894,712, filed Jul. 19, 2004; "Tilt Roller for Control Device," application Ser. No. 10/976,431, filed Oct. 29, 2004; "Magnetic Ratchet for Input Device Roller," application Ser. No. 11/355,507, filed Feb. 15, 2006; "Input Device Roller With Hybrid Magnetic Ratchet System," application Ser. No. 11/355,497, filed Feb. 15, 2006; "Multi-Function Roller Apparatus and Method for a Control Device," application Ser. No. 11/317,267, filed Dec. 23, 2005; "Multi-Function Roller Apparatus and Method for a Control Device," application Ser. No. 11/509,116, filed Aug. 23, 2006; "Multi-Function Roller for a Control Device," application Ser. No. 11/355,823, filed Feb. 15, 2006; and "Split Function Roller for a Control Device," application Ser. No. 11/618,836, filed Dec. 31, 2006.

BACKGROUND OF THE INVENTION

The present invention relates to drivers and software for input devices, and in particular to scrolling and button software.

A scrolling wheel on a mouse typically sends data packets with a count indicating the distance the wheel has turned since the last packet. For keyboards, a scrolling wheel can use scan codes (see Microsoft U.S. Pat. No. 6,686,904). Different programs use these codes for different purposes, most commonly for scrolling in some programs, and zooming in others.

KYE U.S. Pat. No. 6,064,370 describes a flywheel for a scrolling wheel on a mouse. Also, Logitech U.S. Published Application No. 20070146324, "Multi-function roller apparatus and method for a control device," describes a switch for alternating a roller between a ratchet and a smooth roller mode, with a flywheel for extended scrolling in the smooth-roller mode. The roller is mechanically pivoted to a corrugated surface to provide the ratchet function.

A number of computer mice include a roller or wheel which can be rotated by a user's finger. Typically, such a roller is used for scrolling. One example is set forth in Logitech U.S. Pat. No. 6,157,369, and other examples are described in the background section of that patent.

Other patents describing a roller or wheel include U.S. Pat. No. 5,530,455 and U.S. Pat. No. 5,473,344. U.S. Pat. No. 5,530,455 also describes determining the speed of scrolling in the mouse driver software, and switching between line scrolling and page scrolling depending on the speed. Momentum scrolling is also described, where the scrolling continues after the scroll wheel has stopped being turned. Gilligan U.S. Pat. No. 5,313,229 also teaches line or page scrolling.

Microsoft U.S. Pat. No. 7,071,919 sets forth that in a page positional scrolling (PPS) mode useful for scrolling short distances, a displayed document is scrolled one pixel per one pixel of motion of the mouse. In a second mode (document positional scrolling—DPS), the document is scrolled a distance per pixel of mouse movement corresponding to the ratio of the document length (or width) to the page length (or width). In a further embodiment (smoothed document positional scrolling—SDPS), as the mouse is moved away from a starting position the system begins scrolling in PPS, transitions smoothly from PPS to DPS, and then continues to scroll in DPS.

Logitech U.S. Pat. No. 5,805,161 describes a system to jump a pointer to a scroll box and lock the pointer to an elevator of the scroll box.

Samsung U.S. Pat. No. 7,094,980 describes a button near a scroll wheel that changes its function from a focus function when a 1st button is pressed, to a menu selecting function when a second button is pressed.

Microsoft U.S. Pat. No. 6,700,564 describes a horizontal scrolling wheel where the scrolling speed can be affected relative to the amount of displacement of the rotatable member and/or the amount of time that the rotatable member is displaced a predetermined amount.

A button near the scrolling wheel which switches the wheel from controlling vertical to horizontal scrolling is shown in Gillick U.S. Pat. No. 5,530,455 and Toshiba published Japanese application JP 2002366300.

IBM U.S. Pat. No. 5,982,370 describes a user tool (a cursor shaped like a physical highlighter) to mark text on a document, such as an HTML document displayed in a Web browser. Upon selection of this text, and preferably following a time delay, a pop-up menu appears that offers the user the option of searching for this text. Another IBM patent, U.S. Pat. No. 6,584,469, describes querying a knowledge portal when text is highlighted with a mouse. Atomica U.S. Pat. No. 6,341,306 and U.S. Pat. No. 6,519,631 describe right clicking on a word to bring up a "retrieve information" selection, and then searching for data relating to the word in a second computer. IBM U.S. Pat. No. 6,785,670 describes highlighting text in a document, such as a word document, then clicking a mouse to bring up a menu of search engines to use to search the highlighted term.

BRIEF SUMMARY OF THE INVENTION

In one aspect of the invention, the response to the movement of a scroll wheel varies depending upon the application currently being used. For example, in a word processing document, ratcheting may be enabled, while in a photo editing application, ratcheting is disabled since the scroll wheel signal is used for zooming. The speed and acceleration can also be varied depending on the program. These can be default settings, or settings initialized according to user preferences.

In one embodiment, in order for the user to perceive an instantaneous stop to scrolling, a scroll impulse for the reverse direction is artificially generated.

In another aspect of the invention, text can be highlighted and searched by pressing a button on an input device to activate a search. The search can either be an Internet search or a desktop search. Different manners of activating the button (such as a short press vs. a long press) can be used to select between an Internet and desktop search.

DETAILED DESCRIPTION OF THE INVENTION

Figure 1:
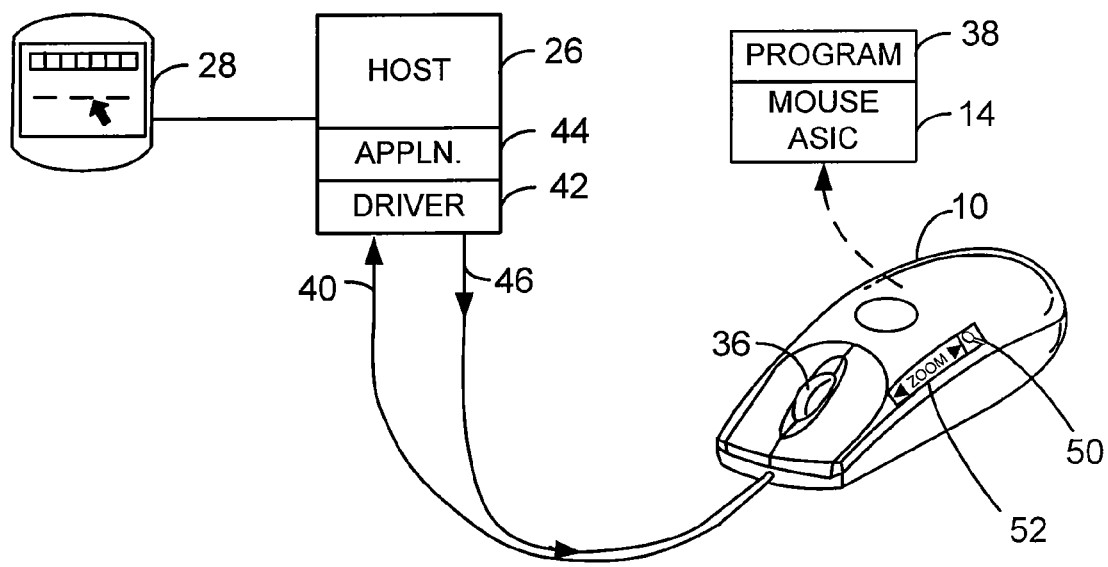
FIG. 1 is a diagram of a mouse connected to a computer with a scroll wheel and search button according to embodiments of the invention.

FIG. 1 is a block diagram of the software used in an embodiment of the present invention. Shown is a mouse 10 with a roller 36. Inside mouse 10 is a processor or ASIC 14 including a program 38 for controlling the mouse. Sensor signals 40 are provided to host computer 26, in particular to a driver 42 in the host. The driver in turn can provide signals to an application program 44, which controls the particular graphics on a display 28. Feedback signals 46 can optionally be provided.

A smartsearch button 50 is provided for activating a search on highlighted text. A zoom slider 52 is an elongated touchpad for performing a zoom function.

Application Specific Behavior

Figure 2:
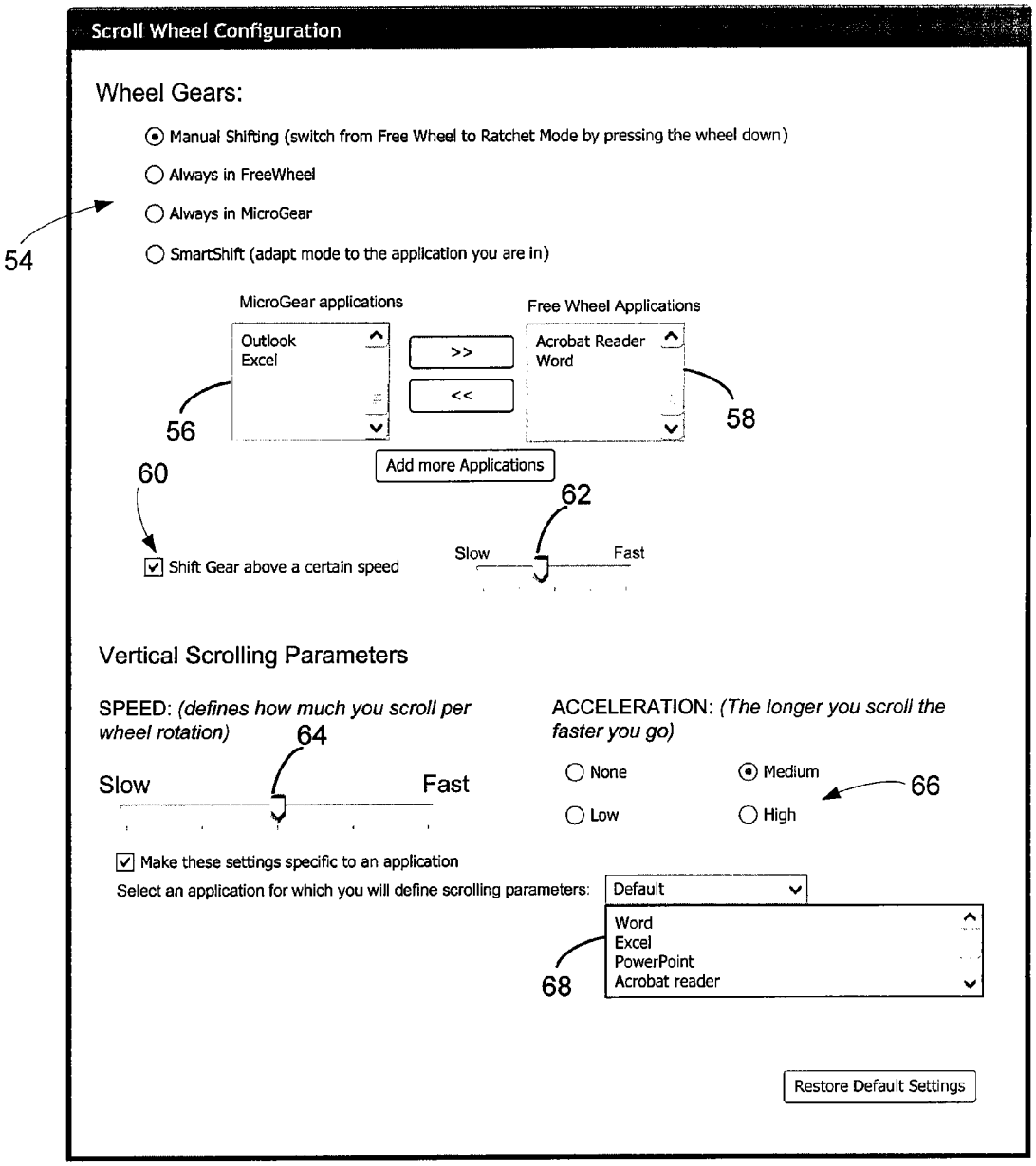
FIG. 2 is a diagram of a GUI for setting application specific scrolling parameters according to an embodiment of the invention.

In one embodiment, different scrolling behaviors can be associated with different applications. Users are able to configure a wheel to a range of functions and make these functions application specific. Examples of functions that can be assigned include:

Zoom +/−
Vista's "Flip" and "Flip 3D"
Vista's Rolodex function
ALT+TAB & ALT+TAB+SHIFT
ALT+ESC/ALT+ESC+SHIFT
Volume +/−
Music Fast Forward/Rewind
Scroll up/down
Cruise up/down FIG. 2 is a diagram of a window for scroll wheel configuration. Four options (54) are provided for scroll wheel settings. "Manual shifting" allows the user to switch from a free wheel mode (no ratcheting) to a ratchet mode by pressing down on the scroll wheel. Alternately, the user can configure the scroll wheel to always be in free wheel mode, or always in ratchet (microgear) mode. Finally, the user can elect "smartshift," which changes mode according to the application being used. Boxes 56 and 58 allow the designation of applications for Microgear (ratchet) and free wheel modes, respectively.

In addition, a checkbox 60 allows the user to have the wheel, when it is in ratchet mode, to switch to free wheel mode above a certain speed. That speed can be varied with a slider 62.

Scrolling behaviors can be separately assigned for each of (1) vertical scrolling, (2) horizontal scrolling and (3) zooming. These functions can be assigned to the same scroll wheel, or, in one embodiment, the scroll wheel rotates for vertical, tilts side-to-side for horizontal, and a separate slider, rocker switch, or other input is used for zoom.

Vertical Scrolling

FIG. 2 shows settings for vertical scrolling. A vertical scrolling speed can be set with slider 64. This will define how much a document is scrolled per wheel rotation. Buttons 66 can be used to select an acceleration curve. In general, such a curve means that the longer one scrolls, the faster one goes. The assumption is that if one is doing scrolling for a short time, one is trying to find something close by. If one is scrolling for a long time, one is probably trying to go a great distance in the document. The speed and acceleration can be set per application, if desired, using selections in box 68.

Zoom

Figure 3:
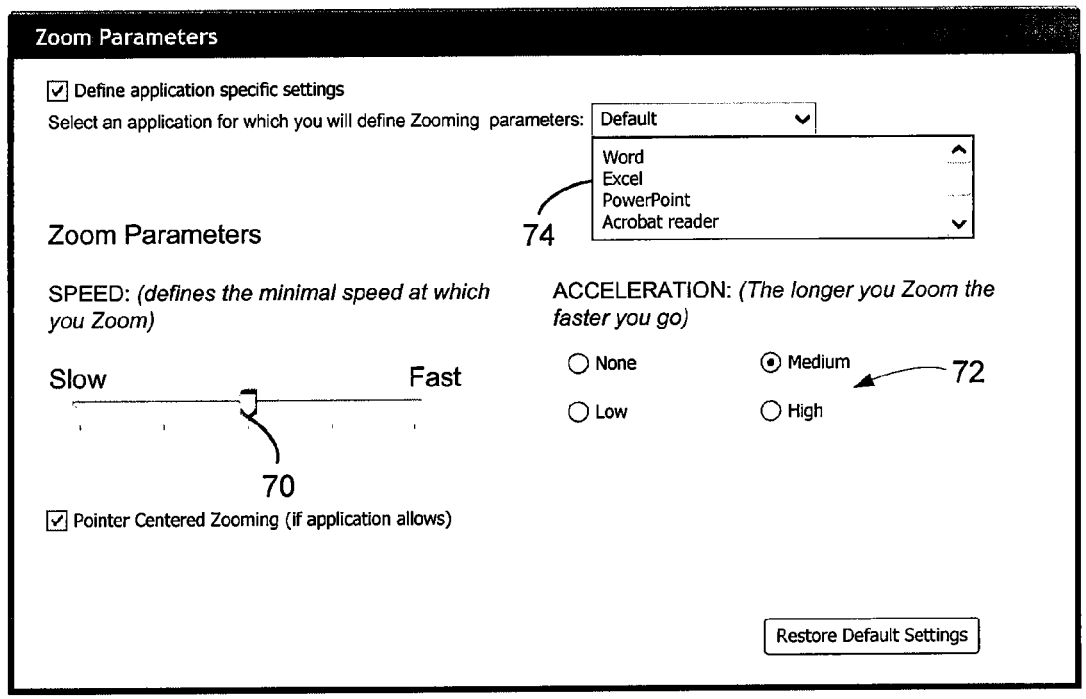
FIG. 3 is a diagram of a GUI for setting zoom parameters according to an embodiment of the invention.

FIG. 3 shows a settings window for a zoom function that has been assigned either to the central scroll wheel, or a separate zoom rocker, slider, wheel, two buttons, pressure switch, or other input. Similar to vertical scrolling, a slider 70 sets speed, buttons 72 select acceleration and box 74 selects applications.

Side-to-Side Scrolling

Figure 4:
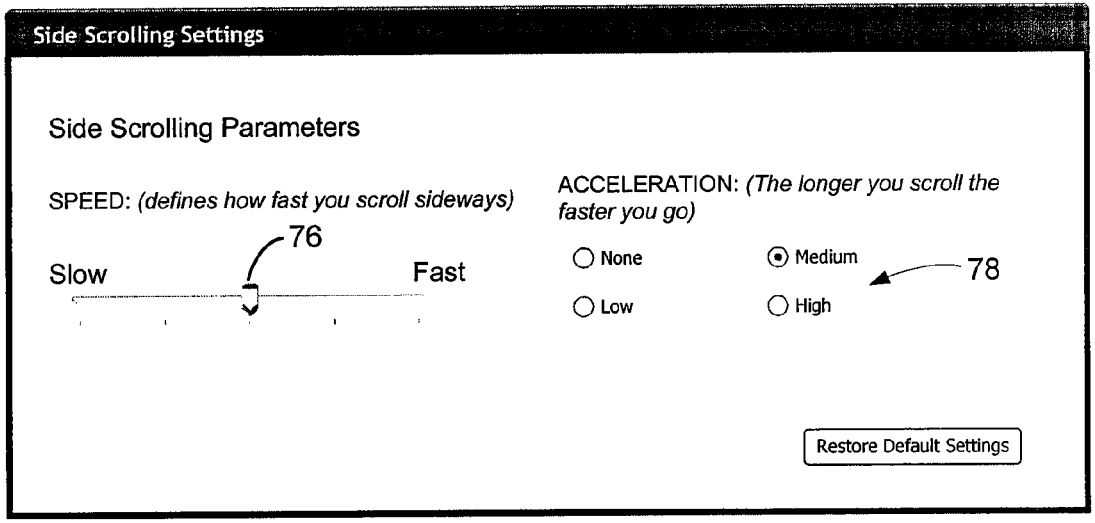
FIG. 4 is a diagram of a GUI for setting side scrolling parameters according to an embodiment of the invention.

In one embodiment, a wheel on an input device in accordance with an embodiment of the present invention is a tilt-wheel, which can be tilted from side to side in order to achieve horizontal scrolling. In one embodiment, acceleration curves are implemented for horizontal scrolling as well. FIG. 4 shows settings for horizontal scrolling, with a slider 76 for speed and buttons 78 for acceleration.

As mentioned above, the discussion above is applicable to zooming as well. For example, a "silk smooth" zooming experience is provided in accordance with an embodiment of the present invention. In one embodiment, zooming is implemented via a switch (or a thumb wheel) which can be moved forward and back, by one or two positions each.

In one embodiment, the thumb wheel can also be activated (e.g., by pressing it in) when in the center position. In one embodiment, such activation is assignable. In one embodiment, such activation assignments are application specific. If zooming functionality is assigned to the thumb wheel, in one embodiment, center activation of this switch can be assigned to setting the zoom to 100%. If forward and rewind, center activation of this switch can be assigned to play and/or pause. If increasing and decreasing volume is assigned to the thumb wheel, in one embodiment, center activation of this switch can be assigned to mute/unmute.

Application Specific Setting-Enhancements

In one embodiment, there are two primary ways to enhance the implementation of application specific settings: (i) creating and presenting the list of users' applications, as well as by adding more/new potential button assignments, and (ii) offering recommended button assignments for leading applications.

In one embodiment, a list of the installed applications is presented to users. The users are not forced to search through their folders to find applications and all of the related files to create application specific assignments.

In accordance with an embodiment of the present invention, users are provided the option of assigning system functions to the buttons on the input device.

Examples of such system functions include:

Trash
Search (More details on this under Smart Search below)
Show Desktop
ALT+TAB & ALT+TAB+SHIFT
ALT+ESC/ALT+ESC+SHIFT
Vista's "Flip" and "Flip 3D"
Close active window
Zoom (+/−)
Volume (+/−)

As users begin to opt for Application specific configurations for their mouse, it makes increasing sense to offer some "recommended" default configurations. In one embodiment, the application list builds automatically for the user and is presented to the user in an easy to understand format. Any function that is different from "standard" default is highlighted in one embodiment.

Some proposed or recommended mappings are included in Table 1 below:

TABLE 1

| Applications | 1 | 2 | 3 - middle | 3 - tilt | 4 | 5 | 6 | 7 |
|---|---|---|---|---|---|---|---|---|
| Windows | click | context menu | swap application | horizontal pan | back | forward | search | zoom |
| Word | click | context menu | swap application | horizontal pan | back | forward | search | page up |
| Excel | click | context menu | swap application | horizontal pan | back | forward | search | zoom |
| Visio | click | context menu | swap application | horizontal pan | back | forward | search | zoom |
| Photoshop | click | context menu | swap application | horizontal pan | back | forward | swap tool | zoom |
| Powerpoint | click | context menu | swap application | horizontal pan | back | forward | search | zoom |
| ACDSEE | click | context menu | swap application | horizontal pan | back | forward | search | zoom |
| Premiere elements | click | context menu | swap application | next chapter | back | forward | search | fast fwd/back |
| notes | click | context menu | swap application | horizontal pan | back | forward | search | volume |
| ... | click | context menu | swap application | horizontal pan | back | forward | search | zoom |
| ... | click | context menu | swap application | horizontal pan | back | forward | search | zoom |
| itunes | click | context menu | swap application | horizontal pan | back | forward | search | volume |
| mediaplay | click | context menu | swap application | horizontal pan | back | forward | search | volume |

In one embodiment, some or all recommended profiles (Application configurations) are downloadable via the web, are included on a CD, or may otherwise be delivered to the user.

Below are some additional proposed mappings in Table 2.

3. Intelligent Engage/Disengage

In this mode, the ratchets will disappear "when appropriate". In another embodiment, an intelligent algorithm is employed to determine when the ratchets are to be engaged/disengaged. Such an algorithm can be a combination of several criteria such as disengaging ratchets when a predetermined (high) speed of scrolling is reached, engaging ratchets at the end of a document/page, engaging ratchets for section breaks, tuning acceleration curves, etc.

In one embodiment, the default setting (in the shell and with an "unknown" application) is for the ratchets to be

TABLE 2

| | SHELL | WEB | EXCEL | WORD | PDF | EMAIL | MSGR | PHOTO | MUSIC |
|---|---|---|---|---|---|---|---|---|---|
| Top Wheel | — | Scroll (up/down) | Scroll (up/down) | Scroll (up/down) | Scroll (up/down) | Scroll (up/down) | Scroll (up/down) | Scroll (up/down) | Scroll (up/down) |
| Top Wheel Tilt | Control↓ Tab/ CTL←Alt+TAB | Scroll (left/right) | Scroll (left/right) | Scroll (left/right) | Scroll (left/right) | Scroll (left/right) | Scroll (left/right) | Scroll (left/right) | Scroll (left/right) |
| Thumb Wheel | Next/Previous | Zoom (in/out) | Zoom (in/out) | Zoom (in/out) | Zoom (in/out) | Email Nav. (next/prev.) | Contact Nav. (next/prev.) | Zoom (in/out) | Song Play (Prev/next) |
| Thumb Activation | Open Doc | — | — | — | — | Open Message | Open Comm. | 100% | Play/ Pause |
| Back/Fwd Button | Universal (back/fwd) | Browser (back/Fwd) | Universal (back/fwd) | Universal (back/fwd) | Universal (back/fwd) | Universal (back/fwd) | Universal (back/fwd) | Universal (back/fwd) | Universal (back/fwd) |
| Top Button | Search | Search | Search | Search | Search | Search | Search | Search | Search |

Dynamic Ratcheting

An input device in accordance with an embodiment of the present invention has an advanced scroll wheel with ratchets that can selectively engage and disengage. When ratchets are disengaged, the heavy metal wheel provides an "inertia fly wheel experience" to users. Users will, in one embodiment, be able to choose among various different ratchet behavior configurations. In one embodiment, the user can choose the desired configuration via the user interface to the software. In another embodiment, the user can choose the desired configuration via a hardware component (e.g., a lever or switch).

In one embodiment, as noted above, users will be able to choose among four (4) ratchet behavior configurations. The configuration of the center button (pressing down on the scroll wheel) can be configured accordingly as set forth below.

1. Always Engaged/Disengaged

Some users may choose to have their scroll wheel always engaged or disengaged. In this case, in one embodiment, the center activation is freely assignable as discussed above.

2. Manual Control

Users can choose to manually engage/disengage the ratchets via the scroll wheel center activation. In this use case, the center activation is "locked" to the engage/disengage.

engaged. In addition, ratchets are engaged for specific applications (e.g., Shell, PPT, XP Photo viewer, Picasa, e.g.). Ratchets are not engaged (i.e., free spin or free wheel mode) is employed for other applications (e.g., Word, Excel, Email, Internet Explorer, Acrobat, Media Players, Image Creation/Editing, etc.). In another embodiment, users can configure which applications have ratcheting and which do not via the user interface. In one embodiment, users will be presented with a list of applications and then choose which will have "Free Wheeling." The table below sets forth some options for intelligent engage/disengage.

TABLE 3

Ratchet Disengagement and Engagement Table

| Conditions for: | User actions |
|---|---|
| Initial disengagement | A minimum angular velocity is reached OR A minimum angular acceleration is reached OR |

TABLE 3-continued

Ratchet Disengagement and Engagement Table

| Conditions for: | User actions |
|---|---|
| On-the-fly engagement | A long document scrolling behavior is recognized (repeated sequences of scrolling in a given direction) Wheel is stopped OR Wheel rotation direction changes (implies angular speed reaches 0) |

Instant Response

When the user suddenly stops at the desired location, scrolling on-screen should also instantly halt. Equally, if the user rapidly scrolls past desired content and then suddenly tries to scroll back in the opposite direction, the on screen response should be perceived by the user as instantaneous. The concern is that when users are rapidly scrolling via the metal inertia scroll wheel, the buffer will fill up. In one embodiment, this is addressed by managing the system queue. In one embodiment, the maximum speed of the wheel is set so as to not overflow the buffer. When a wheel stop is detected, the buffer is emptied.

In one embodiment, for certain applications, in order for an instantaneous stop to be perceived by the user when scrolling stops, a scroll impulse for the reverse direction is artificially generated and sent to the host.

Smart Searching

In accordance with an aspect of the present invention, users are provided with easy and seamless access to a variety of search engines for both desktop and web search. A button on the device has a default setting for "Search," although the user will be able to assign other functions to this button as well. If the software is not loaded and/or configured, the user attempts to use the search button, the user will be offered the option of configuring the button when he or she first uses the button.

Pressing the search button will launch a default search application, such as Yahoo! Q (or Yahoo! Live) contextual search from Yahoo (Sunnyvale, Calif.), Google search from Google (Mountain View, Calif.) or a desktop search, such as Google, MSN, XP or Vista desktop search. The user can specify the default search application or can manually enter a URL.

In one embodiment, the default assignment for the application will be Web search. Users will be able to change this to be "Desktop search." In one embodiment, a short press of the search button results in a desktop search, while a long press results in a web search. In another embodiment, this is reversed. Other varying methods of activation could be used to select between web and desktop searches, such as a single press or "click" and a double press. Alternately, the type of search could be the last type of search done within a predetermined time period.

Figure 5:
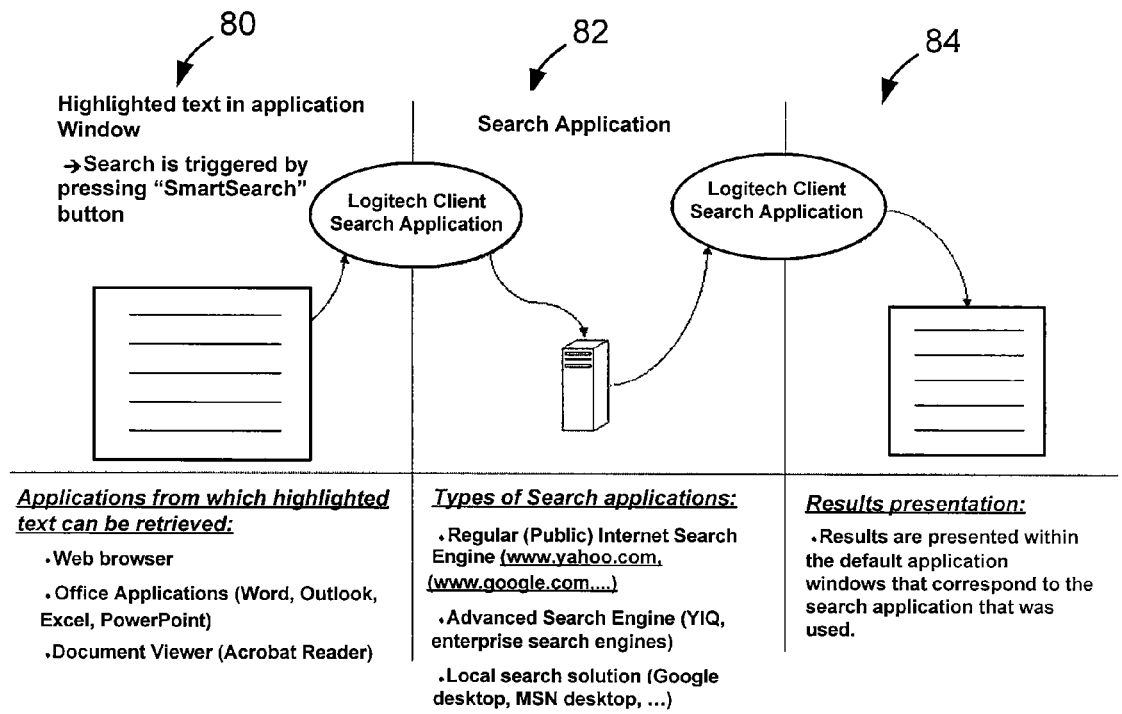
FIG. 5 is a diagram of the smart search operation according to an embodiment of the invention.

FIG. 5 illustrates the smart search operation. In a first step 80, the user highlights text in an application, and presses the smart search button. In step 82, the search application is brought up and the browser launched to perform the search. In one embodiment, the highlighted text is presented in the search box, but the search isn't started until the user clicks search, or a present amount of time elapses. This gives the user the opportunity to edit the highlighted text before the search is done. In one embodiment, the search will automatically proceed without the opportunity for editing. The user has the option to pause the search to give time for editing by pressing the search button again, or clicking on the mouse, or any other configured input. In step 84, the search results are presented to the user.

Below are some examples of some scenarios in accordance with some embodiments of the present invention.

Yahoo! Contextual Search within Word and Other Common Applications

1. User working with an application on the desktop (e.g., Word)
2. User seeks information within context of document
3. User selects the text
4. User clicks the search button to send term/string to Yahoo! Search
5. Overlay appears with contextually related results.
6. Note: If no content is selected, pressing the button will open the search dialogue window in accordance with an embodiment of the present invention.

Yahoo! Contextual Search on the Web

Figure 6:
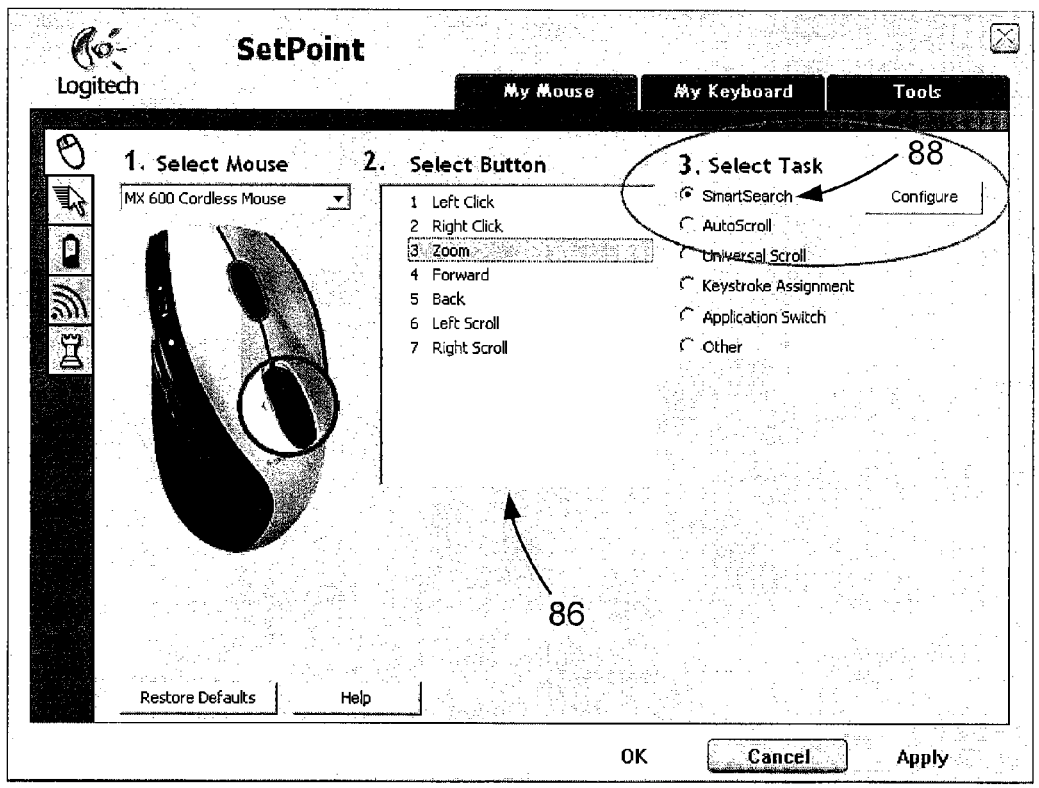
FIG. 6 is a diagram of a GUI for enabling smart search according to an embodiment of the invention.

1. User highlights search term in active web page
2. User clicks the search button for context menu
3. User selects "Search the Web for [search term]"
4. Search results are returned FIG. 6 shows an embodiment of a configuration window for the buttons on a mouse, which allows a user to customize the settings. A button selected from box 86 can be assigned a function, such as smart search function 88. Alternately, a dedicated smart search button can be used, such as button 50 in FIG. 1.

Figure 7:
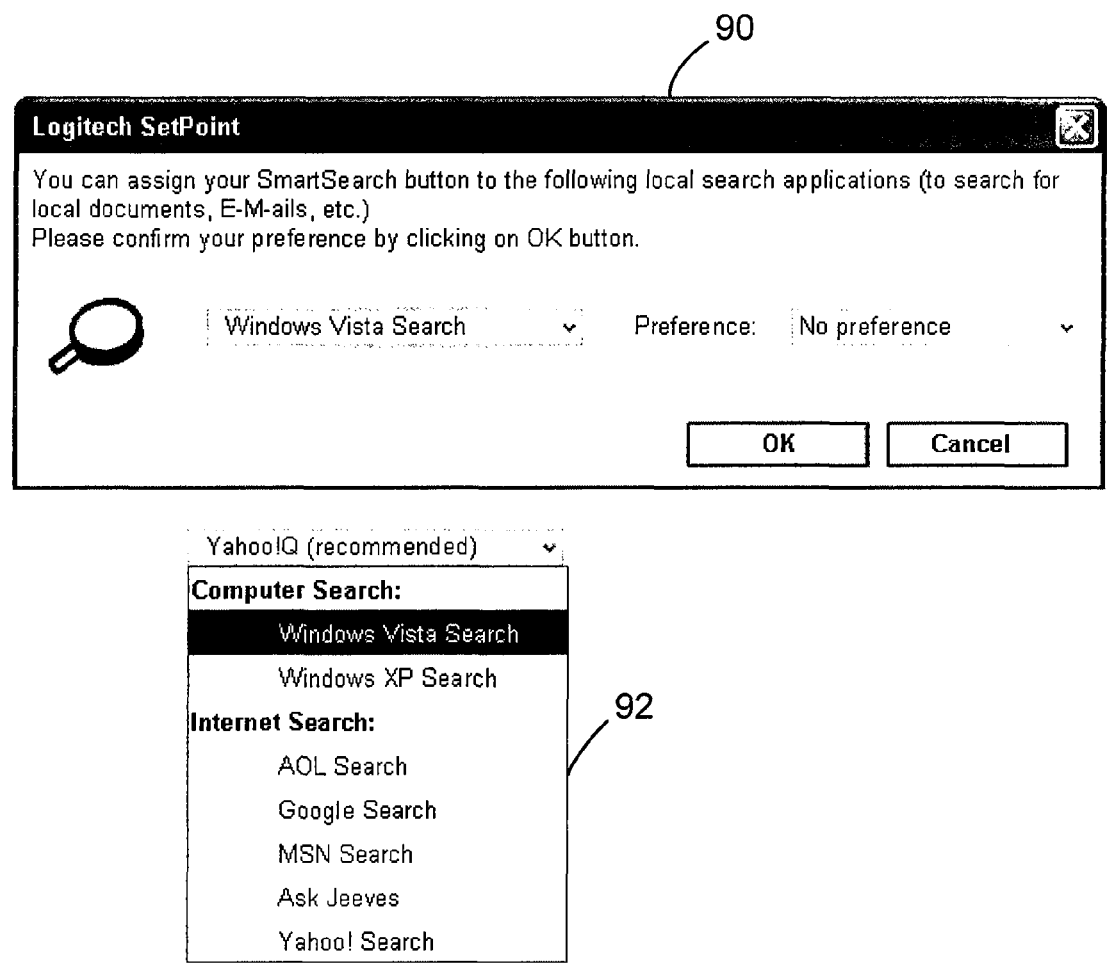
FIG. 7 is a diagram of a GUI for assigning the smart search button according to an embodiment of the invention.

FIG. 7 illustrates a configuration window 90 for setting the default web and desktop search options. A drop-down list 92 shows a number of possible default choices for the local, computer search and for the web search.

It is to be understood that the examples and embodiments described above are for illustrative purposes only and that various modifications or changes in light thereof will be suggested to persons skilled in the art and are to be included within the spirit and purview of this application and scope of the appended claims. For example, while one described embodiment includes a mouse, the roller may be included in a variety of control devices, such as a trackball, a keyboard, a touch pad, a joy stick or the like. Therefore, the above description should not be understood as limiting the scope of the invention as defined by the claims.

What is claimed is:

1. A computer input system comprising:
a wheel on a computer input device; and
a processor configured to execute computer readable instructions stored on non-transitory computer readable media, the computer readable instructions configured for:
determining which application program of a plurality of application programs is being executed;
identifying a predefined function of the wheel associated with the application program being executed, the predefined function being one function of a plurality of available functions; and
dynamically varying an operation of the wheel to correspond to the predefined function of the application program being executed.

2. The system of claim 1 further comprising:
non-transitory computer readable media storing computer readable instructions for determining when to provide one of a ratchet and a free wheel effect depending an application program being used.

3. The system of claim 1 further comprising non-transitory computer readable media storing computer readable instructions for dynamically varying speed and acceleration depending on the program.

4. The system of claim 1 further comprising non-transitory computer readable media storing computer readable instructions for:
receiving one or more inputs to assign the function of said wheel for each of the plurality of application programs.

5. The system of claim 1 wherein the function of said wheel is variable, depending on the application, in all of (a) the use of ratcheting, (b) the switching between ratcheting and free wheel modes, (c) speed, and (d) acceleration.

6. The system of claim 1 further wherein said computer readable instructions provide a user the ability to select between multiple modes, said modes including (a) manual shifting between free wheel and ratchet modes, and (b) shifting between free wheel and ratchet according to preset criteria.

7. The system of claim 6 wherein said modes further include (c) always in free wheel and (d) always in ratcheting.

8. A method comprising:
detecting the movement of a wheel on a computer input device;
determining which application program of a plurality of application programs is being executed;
identifying a predefined function corresponding to the movement of the wheel and associated with the application program being executed, the predefined function being one function of a plurality of available functions; and
dynamically varying a function of said wheel based on the application program being executed, the function being predefined for each of the plurality of application programs.

9. The method of claim 8 further comprising:
determining when to provide one of a ratchet and a free wheel effect depending an application program being used.

10. The method of claim 8 further comprising varying speed and acceleration depending on the program.

11. The method of claim 8 further comprising:
receiving one or more inputs to assign the function of said wheel for each of the plurality of application programs.

12. The method of claim 8 wherein the function of said wheel is variable, depending on the application, in all of (a) the use of ratcheting, (b) the switching between ratcheting and free wheel modes, (c) speed, and (d) acceleration.

13. The method of claim 8 further comprising providing a user the ability to select between multiple modes, said modes including (a) manual shifting between free wheel and ratchet modes, and (b) shifting between free wheel and ratchet according to preset criteria.

14. The method of claim 13 wherein said modes further include (c) always in free wheel and (d) always in ratcheting.

\* \* \* \* \*